IMAGE PROJECTION

Filed May 25, 1959 2 Sheets-Sheet 1

INVENTORS
ERNEST H. LEHMANN
WILLIAM DAVID WRIGHT
BY Stanley Z. Cole
ATTORNEY

INVENTORS
ERNEST H. LEHMANN
WILLIAM DAVID WRIGHT
BY
ATTORNEY

United States Patent Office 3,051,041

Patented Aug. 28, 1962

3,051,041

IMAGE PROJECTION

Ernest Henry Lehmann, Rochester, N.Y., and William David Wright, London, England, assignors to Xerox Corporation, a corporation of New York Filed May 25, 1959, Ser. No. 815,475
5 Claims. (Cl. 88—24)

This invention deals with xerography, and particularly with an improved projection system.

Recently, and particularly in connection with the art of xerography, there has been developed an improved means for producing bright visual displays of the developed image. Techniques and embodiments to produce such displays are disclosed, for example, in copending patent application Serial No. 738,520.

This invention constitutes an improvement over copending application Serial No. 738,520 and has for its objects that of devising novel means for improved projection optics as applied to the invention described in the aforesaid copending patent application.

It is accordingly an object of the present invention to provide improved projection methods and apparatus to project images.

For a better understanding of the invention, as well as other objects and further features thereof, reference is had to the following detailed description thereof to be read in conjunction with the accompanying drawings, wherein.

Figures 1, 2, 3:
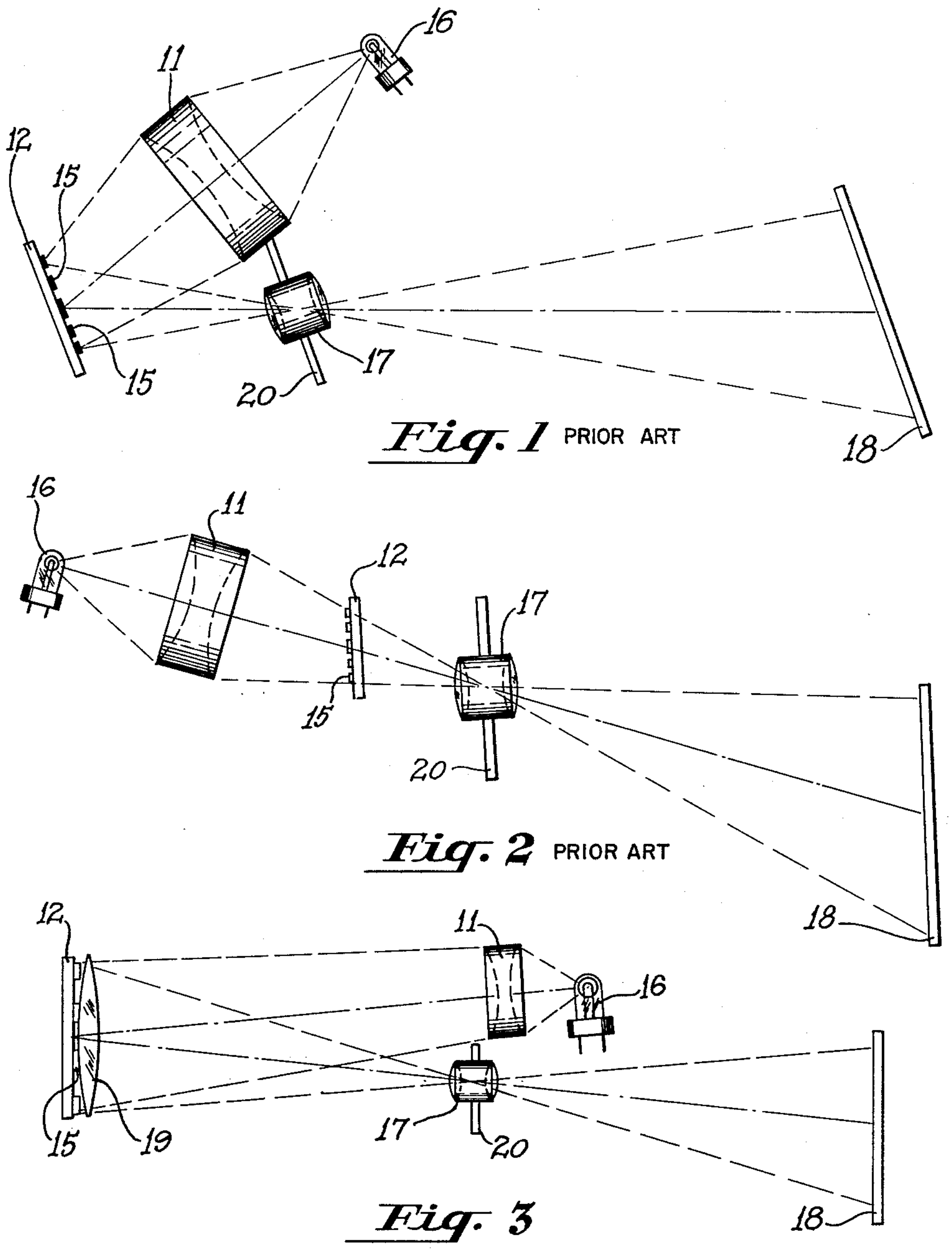
Fig. 1 PRIOR ART, Fig. 2 PRIOR ART, Fig. 3
FIG. 1 is a diagrammatic representation of the projection optics arrangement which this invention improves upon for projecting a reflected light image for viewing on a viewing surface.
FIG. 2 is the equivalent unreflected optical system corresponding to that of FIG. 1.
FIG. 3 is a diagrammatic representation of projection apparatus according to the present invention.

For a better understanding of this invention, reference is now had to FIG. 1, wherein is illustrated a projection system. In this system an image bearing layer 12 carries on its surface image 15. Light rays from source 16 are directed through condenser 11 to image bearing layer 12 where they are reflected and pass through projection lens 17 to screen 18. The surface of image bearing layer 12 is specular. It may, for example, comprise vitreous or amorphous selenium or it may comprise other photoconductive insulating layers having specular reflecting surface as, for example, a specular reflecting coating of a zinc oxide pigmented resin binder or the like, or it may comprise an overcoated photoconductive insulating layer in which the overcoating comprises the specular reflecting surface in which case the composition of the photoconductive insulating layer is not in and of itself an essential element to bring about projection in accordance with this invention. The overcoating may comprise, for example, a resin such as a polyvinyl acetal. It is possible and desirable in some cases to use an opaque overcoating such as dye containing polyvinyl acetal. Image bearing layer 12 may also comprise a transparent material overlying a specular reflecting surface as, for example, a transparent layer of anthracene overlying a tin oxide mirror-like layer. Layer 12 may also comprise a metal or metal-like material, such as, for example, foil, polished metal layers, evaporated or deposited metal layers, and the like. It is to be realized that the examples set forth all may be employed in the art of xerography as the xerographic plate or the surface to which the image is transferred or on which it is formed, and that such examples have been included herein because of the particular value of this invention to the art of xerography. It is to be realized, however, that other specular image bearing surfaces exist and are well known to those skilled in the art, and it is intended to include them herein.

The surface of image bearing layer 12 is characterized as being mirror-like and of sufficiently high optical quality to enable it to reflect with substantially no distortion. In particular, the surface should be free of waviness, ripples or other surface imperfections and irregularities.

The image material on the surface of layer 12 is characterized by its light scattering properties and the light radiation collected by projection lens 17 substantially only includes light reflection from the surface in uncovered areas. To further assure that light scattered by image 15 does not reach screen or image receiving surface 18, lens 17 is mounted in opaque shield 20. Lens 17 is positioned at the proper distance from image bearing layer 12 to focus the image bearing surface of layer 12 onto image receiving surface 18 and at the same time light source 16, condenser 11 and the image bearing surface of layer 12 are positioned to focus light source 16 at lens 17.

In accordance with the laws governing the specular reflection of light in which the angle of reflection is equal to the angle of incidence, light source 16 and the condenser 11 are so positioned to reflect light from the surface of image bearing layer 12 into lens 17 to project onto image receiving surface 18. In order to prevent the appearance of undesired structure in the projected image, condenser 11 should illuminate image bearing layer 12 as uniformly as possible and in particular the filament structure, if any, of light source 16 should not be apparent.

Image 15 may comprise any irregular light scattering material. Thus, it may comprise layers of powder particles, whether opaque or transparent, which are characterized by being non-specular and not film-like. In particular, and as a further example, all particulate xerographic developers now known work well as image 15. Such developers are described in U.S. Patents 2,618,552, 2,815,330, 2,791,949 and the like.

Image receiving surface 18 may comprise a diffuse opaque reflecting surface such as a sheet of paper or a solid member covered with white paint, aluminum paint or a layer of glass beads, or it may comprise a conventional projection screen or it may comprise a translucent diffusing surface such as ground glass or tracing paper in which case the projected image may be viewed from either side of the screen.

For rectilinear projection, effectively free from distortion, lens 17 will normally be positioned in a plane closely parallel to the image bearing surface of image bearing layer 12 and to image receiving surface 18. Otherwise, there may be lack of uniformity of definition across the image and/or a keystoning effect may be present. In some instances keystoning may be permissible, particularly if the image on layer 12 has been formed with a keystoning effect sufficient to counteract and compensate for the keystoning introduced by the projection system.

FIG. 2 represents the unreflected equivalent of FIG. 1. Thus FIG. 2, which is not intended to represent an actual projection system, can be thought of as the system of FIG. 1 in which reflecting image bearing member 12 has been replaced by a corresponding transparent member and in which lens 17 has again been repositioned at the focal point of light source 16. This figure is intended to illustrate with greater clarity the optical relations existing between the elements shown in FIG. 1. Thus, it can be seen in the consideration of either FIG. 1 or FIG. 2 that the light leaving condenser 11 is necessarily converging and that accordingly, condenser 11 must be physically larger than the area of image bearing member 12 which is being projected. Thus, in order to project a reasonable size portion of image bearing member 12 it is necessary to use a relatively large, heavy, cumbersome and expensive condensing lens.

As should be apparent from a consideration of FIG. 1, a number of optical projection systems embodying the elements illustrated in FIG. 1 can be positioned at different points about the image bearing layer in order to project from image bearing layer 12 independently onto screens. Obviously, however, there is a practical limitation on such a system of multiple projection imposed by the condensing lens. Because of its size, the condensing lens places physical limits on the number of projection systems which can be located in the restricted space adjacent to image bearing layer 12.

One can also deduce from FIG. 2 that condenser 11 could be made smaller than the projected areas of image bearing member 12 provided that lens 17 were made larger in order to accommodate the diverging beam of light from condenser 11 and shown unfolded in this figure. It will be appreciated, however, that this is unrealistic in a practical arrangement, since real limitations exist as to the ratios of lens diameter to focal length in projection lenses and the cost of a large size lens as compared to a large size condenser can be prohibitive, thus preventing the adoption of such a system.

It will also be apparent from FIG. 1 that the presence of a very large condensing lens necessitates placing the projection lens 17 at a considerable angle from a normal through the center of image bearing member 12. When coupled with the requirement that the lens be parallel to image bearing member 12, the lens must accordingly be positioned with its axis at a considerable angle from the direction of projection which results in vignetting and/or degradation of image quality. Even if condenser 11 were reduced in size with a corresponding increase in the diameter of lens 17, the same problem arises, because the lens would in such an instance physically interfere with the condenser instead of vice versa. It is possible by varying the size of focal length of the lens and the condenser to alter the angle between the light incident upon and reflected from image bearing member 12, but it is not possible to reduce this angle to any great extent employing the projection system of FIG. 1.

These various problems and difficulties associated with the projection system of FIG. 1 are overcome by this invention.

Figures 4, 5:
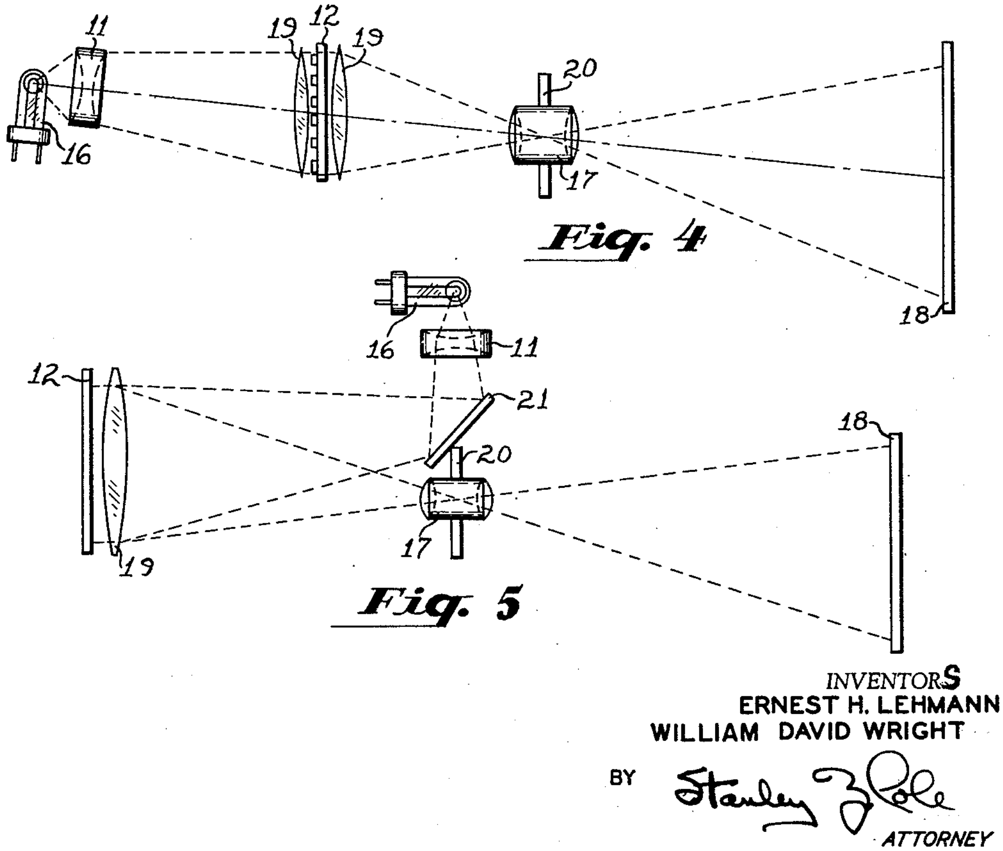
FIG. 4 is the equivalent unreflected optical system corresponding to that of FIG. 3.
FIG. 5 is another embodiment of apparatus according to this invention.

In FIG. 3 is shown the new optical system of this invention and in FIG. 4 is shown the unreflected equivalent of the system of FIG. 3. Like numerals are used in these figures to designate like parts described in FIGS. 1 and 2. Thus, in FIG. 3 lamp 16 projects light through condenser 11 and the beams emerging from condenser 11 are directed onto image bearing member 12 bearing an image 15. The image, which is specularly reflected back from the surface of image bearing member 12, is directed through lens 17 in a shield 20 and the projected image is imaged on image receiving surface 18. In this figure the condensing lens is relatively smaller than the projected area of image bearing member 12, and an additional convex or converging lens 19 is positioned closely adjacent to the surface of member 12. The function of lens 19 is more readily apparent when examining FIG. 4. As is shown, the light leaves condenser 11 in a diverging path sufficient to uniformly illuminate the desired area of image be a ring member 12. As the light traverses lens 19 towards image bearing member 12, it is slightly refracted. Accordingly, lens 19 complements condenser 11 and in its position in the line of travel of light to the specularly reflecting surface it acts in combination with condenser 11 to make up the condensing system. After reflection from member 12, the light again passes through lens 19 where it is converged onto projection lens 17 positioned in shield 20. Since lens 19 is positioned closely adjacent to members 12, it refracts the light reflected therefrom, without imaging the light passing therethrough. Accordingly, the effect of lens 17 in projecting image bearing surface 12 onto screen 18 is very little affected by the presence of lens 19. In order to make the effect of lens 19 on lens 17 as small as possible, it is desired that lens 19 be positioned as close as is physically practicable to the image bearing surface of member 12. It is generally not desired to place lens 19 in actual physical contact with member 12 in order to prevent disturbance of the powder image thereon. To the extent that lens 19 modifies lens 17, the projection lens may be considered to be a combination of lenses 17 and 19. In some cases it may be desirable to apply known anti-reflection coatings to the surfaces of lens 19 to prevent light specularly reflected off the lens from interfering with the desired specular reflection of light from surface 12.

Although lens 19 does not greatly modify the magnification of lens 17 or the position of the final image, it does serve to converge the beam of light emerging from condenser 11. Thus, the light emerging from condenser 11 may be diverging and yet may be brought to a focus on lens 17. Alternatively, the light emerging from condenser 11 may be in the form of a parallel or a slightly converging beam. Thus, condenser 11 may be much smaller than in the embodiment of FIG. 1, and in particular, may be much smaller than the projected area of member 12. Accordingly, referring to FIG. 3, it is apparent that the angles of light incident upon and reflected from member 12 may be much closer to the normal of member 12 and lens 17 may be operated with its axis much more closely aligned with the direction of projection. Thus, by the incorporation of lens 19 it is at once possible to make condenser 11 smaller and less cumbersome, to enlarge the projected area of member 12 and to make more axial use of the field of view of lens 17, thereby improving the sharpness of projection. In addition, because of the reduced size of condenser 11 and further, because of the ability to use a single lens 19 as a component of many independent projection systems, it now becomes possible to project the image surface of image bearing layer 12 through many more independent projection systems than have heretofore been possible for utilization on independent screens or for examination as composites.

As previously stated, lens 19 should be positioned as closely as possible to image bearing member 12 in order to minimize its effect on the magnification of the system and also to minimize its effects on the aberrations of the optical system. Since the contributions of lens 19 to the system aberrations can be made quite small, lens 19 need not be of the highest quality, although it should be clear and free of bubbles, scratches, etc. It might be desirable in some cases to re-design lens 17 to compensate for aberrations introduced by lens 19, but in practical systems this has not been found necessary to achieve a desirable quality in the image projected on screen 18. The focal length of lens 19 should be so chosen that light from light source 16 passing through condenser 11 and passing twice through lens 19 will be imaged on projection lens 17. A relatively thin plano convex lens with its curved surface adjacent to member 12 is one desirable embodiment of lens 19. Where some structure is permissible in the projected image, lens 19 may comprise a Fresnel lens such as a thin plastic Fresnel lens. Such plastic Fresnel lenses are readily available.

Although condenser 11 is believed to be an essential element of the prior art apparatus, as represented by FIGURES 1 and 2, it is not an essential element of the present invention. The primary function of condenser 11 in the present invention is to form an enlarged virtual image of light source 16, leading to the formation of a brighter projected image. In many cases, however, an adequately bright projected image can be had without the use of condenser 11 and in such cases a neater and more compact form of apparatus will result if a condenser is omitted. Where condenser 11 is not employed, the apparatus should be so adjusted that lens 19 will image light source 16 at projection lens 17.

FIG. 5 is another embodiment of apparatus according to this invention. It differs from that of FIG. 3 solely by the presence of mirror 21 together with a re-positioning of light source 16 and condenser 11. By moving the light source and condenser away from the optical axis it is frequently possible to reduce the angle between the optical axis of the apparatus and the light incident on image layer 12. This is principally true because the present invention requires at most a small condenser, thereby permitting mirror 21 to be small and placed quite close to a normal drawn through the center of image layer 12. In this form of apparatus as in others according to the invention, condenser 11 may be eliminated. The advantages arising from the use of mirror 21 are not realized in the prior art apparatus because the large condensers necessitated therein would require the use of equally large mirrors which could not be placed sufficiently close to the optical axis of the apparatus.

Figure 6:
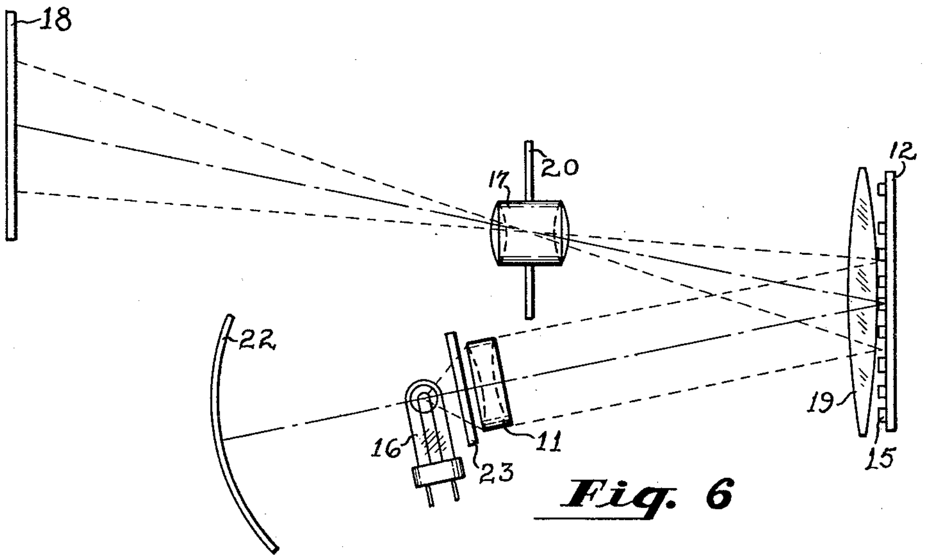
FIG. 6 is still another embodiment of apparatus according to this invention.

FIG. 6 is still another embodiment of apparatus according to this invention. It contains two additional elements not found in FIG. 3; namely, a spherical mirror 22 and a piece of heat absorbing glass 23. In a particular apparatus constructed according to this figure, mirror 22 had a radius of curvature of 4.83 inches and was positioned 4.83 inches behind light source 16 which was a 1,000-watt T–12 incandescent lamp. Heat absorbing glass 23 was placed between light source 16 and condenser 11 to absorb excess heat emitted by the light source. Condenser 11 was a double convex lens with a diameter of 56 millimeters and focal length of 50 millimeters and was positioned approximately 1¾ inches in front of light source 16. With this arrangement a substantially parallel beam of light was directed at image layer 12, which was about 9¾ inches from condenser 11, at an angle of 11½ degrees from the normal to layer 12. It is apparent that either of condenser 11 or mirror 22 could be omitted with a consequent loss in light intensity, but without otherwise rendering the apparatus inoperative. Image layer 12 was about 2 by 2½ inches and lens 19 which was mounted closely adjacent was a double convex lens with a diameter of 128 millimeters and a focal length of 340 millimeters. Projection lens 17 was a conventional F4.5 lens of 7½ inch nominal focal length and was mounted about 7⅞ inches from image layer 12 so as to project a bright image on image receiving surface 18 which was mounted about 22 feet distant. There was thus projected onto image receiving surface 18 a sharp and distinct representation of image 15 with an enlargement of about 34 diameters and an incident intensity of about 17 foot candles.

While specific embodiments of the present invention have been described, as should be readily apparent, the instant invention may be readily modified to incorporate elements known to those skilled in the art, such as the incorporation of the concepts of this invention with an automatic xerographic machine and the like, and that such variations and modifications which will occur to those skilled in the art are intended to be included within the scope of this invention, as expressed in the appended claims.

What is claimed is:

1. In projection apparatus having a light source, a condenser, a specular reflecting surface bearing a light diffusing pattern of material, a projection lens and a viewing screen and in which the elements are arranged to pass the light from said light source through said condenser to the specular reflecting surface and specularly back from the specular reflecting surface through said lens and to said viewing screen and in which said projection lens is positioned relative to said specularly reflecting surface and to said screen to focus said specularly reflecting surface onto said screen, the improvement comprising positioning a converging lens adjacent to and across said specular reflecting surface so that light from said condenser passes through said converging lens to said specular reflecting surface and is then specularly reflected back through said converging lens to said projection lens and to said viewing screen.

2. Apparatus for projecting a light dispersing image on a specularly reflecting surface onto a viewing screen comprising a light source, a converging field lens positioned with respect to said light source to intercept the beam of light therefrom, means to support a specularly reflecting surface bearing a light dispersing image pattern closely adjacent to said converging field lens, said converging field lens being co-extensive in area with the object area on the specularly reflecting surface to be projected, an opaque shield having an aperture therein, said shield being positioned to intercept substantially all light scattered from the light dispersing image on the specularly reflecting surface, said aperture in said shield located in the path of light specularly reflected from the specularly reflecting surface, and a projection lens mounted in said aperture and at the imaging point of the specular reflection passing through said converging lens from said specular reflecting surface, said projection lens having an entrance pupil large enough only to pass light specularly reflected from said light source by the specularly reflecting surface.

3. Apparatus according to claim 2 including a screen at a focal distance from said projection lens for viewing the specularly reflected projected image.

4. Apparatus for projecting a light diffusing image on a specularly reflecting surface onto a viewing screen comprising a light source, a condenser positioned adjacent said light source, a converging lens positioned with respect to said condenser to intercept the beam of light therefrom, means to support a specularly reflecting surface closely adjacent to said converging lens, said converging lens being substantially co-extensive in area with the object area on the specularly reflecting surface being projected, an opaque shield having an aperture therein, said shield being positioned to intercept substantially all light scattered by the light diffusing image on the specularly reflecting surface, said aperture in said shield located in the path of light specularly reflected from the specularly reflecting surface, and a projection lens mounted in said aperture and at the imaging point of the specularly reflecting image from said specularly reflecting surface passing through said converging lens, said projection lens having an entrance pupil large enough only to pass light specularly reflected from said light source by the specularly reflecting surface.

5. Apparatus according to claim 4 including a screen at a focal distance from said projection lens for viewing the projected image.

References Cited in the file of this patent

UNITED STATES PATENTS

| | | |
|---|---|---|
| 957,502 | Dupuis | May 10, 1910 |
| 1,902,907 | Semenitz | Mar. 28, 1933 |
| 2,366,194 | Kaiser | Jan. 2, 1945 |
| 2,424,976 | Golay et al. | Aug. 5, 1947 |
| 2,883,908 | Copeland | Apr. 28, 1959 |